US009670792B2

(12) United States Patent
Wiebe

(10) Patent No.: US 9,670,792 B2
(45) Date of Patent: Jun. 6, 2017

(54) METHOD OF MAKING A TURBOMACHINE

(71) Applicant: Atlas Copco Energas GmbH, Köln (DE)

(72) Inventor: Frank Wiebe, Dormagen-Gohr (DE)

(73) Assignee: ATLAS COPCO ENERGAS GMBH, Cologne (DE)

( * ) Notice: Subject to any disclaimer, the term of this patent is extended or adjusted under 35 U.S.C. 154(b) by 41 days.

(21) Appl. No.: 14/746,871

(22) Filed: Jun. 23, 2015

(65) Prior Publication Data

US 2015/0292330 A1 Oct. 15, 2015

Related U.S. Application Data

(63) Continuation-in-part of application No. 13/417,507, filed on Mar. 12, 2012, now abandoned.

(30) Foreign Application Priority Data

Mar. 24, 2011 (DE) .................. 10 2011 001 530

(51) Int. Cl.
*B23P 15/04* (2006.01)
*F01D 15/10* (2006.01)
(Continued)

(52) U.S. Cl.
CPC ............. *F01D 15/10* (2013.01); *F01D 25/16* (2013.01); *F02C 7/06* (2013.01); *F04D 17/122* (2013.01); *F04D 25/0606* (2013.01); *F04D 29/051* (2013.01); *F04D 29/053* (2013.01); *F04D 29/058* (2013.01); *F05D 2220/40* (2013.01); *F05D 2220/76* (2013.01); *F05D 2230/60* (2013.01); *F05D 2230/70* (2013.01); *F05D 2230/72* (2013.01); *F05D 2240/51* (2013.01); *F05D 2240/515* (2013.01); *F05D 2240/52* (2013.01); *F05D 2240/54* (2013.01); *F05D 2260/34* (2013.01)

(58) Field of Classification Search
CPC ........... Y10T 29/4932; Y10T 29/49321; Y10T 29/49323; F01D 15/10; F04D 29/051; F04D 29/058; F04D 17/122; F04D 25/0606; F04D 29/053
USPC ............................. 29/889.2, 889.21, 889.22
See application file for complete search history.

(56) References Cited

U.S. PATENT DOCUMENTS

| 4,358,253 A | * | 11/1982 | Okano | .................. | F01D 25/166 |
| | | | | | 384/368 |
| 2012/0243986 A1 | * | 9/2012 | Wiebe | ..................... | F01D 15/10 |
| | | | | | 415/229 |

* cited by examiner

*Primary Examiner* — Gregory Anderson
*Assistant Examiner* — Maxime Adjagbe
(74) *Attorney, Agent, or Firm* — Andrew Wilford

(57) ABSTRACT

A turbomachine is made by first providing a stepped shaft having a large-diameter cylindrical portion, an intermediate-diameter cylindrical portion, and a small-diameter cylindrical portion all centered on a common axis. A separately manufactured a one-piece and annular first impeller wheel is then permanently mounted on the large-diameter portion with a back face of the first wheel facing axially toward the intermediate-diameter portion and carrying a rotor bearing half of an axial magnetic bearing. A rotor ring of a radial bearing is then detachably mounted on the intermediate-diameter portion of the shaft, and finally a one-piece and annular second impeller wheel is detachably mounted on the small-diameter portion of the shaft with a back face of the second wheel facing axially toward the first wheel and carrying a rotor bearing half of another axial magnetic bearing.

9 Claims, 1 Drawing Sheet

(51) Int. Cl.
*F01D 25/16* (2006.01)
*F02C 7/06* (2006.01)
*F04D 17/12* (2006.01)
*F04D 25/06* (2006.01)
*F04D 29/051* (2006.01)
*F04D 29/058* (2006.01)
*F04D 29/053* (2006.01)

METHOD OF MAKING A TURBOMACHINE

CROSS-REFERENCE TO RELATED APPLICATIONS

This application is a continuation-in-part of copending application Ser. No. 13/417,507 filed 12 Mar. 2012 with a claim to the priority of German application 10 2011 001 530.2 filed 24 Mar. 2011.

FIELD OF THE INVENTION

The present invention relates to a turbomachine. More particularly this invention concerns a method of making an impeller wheel for a turbomachine.

BACKGROUND OF THE INVENTION

A turbomachine is known having at least one first and one second impeller wheel whose back faces confront each other, a rotor shaft carrying two radial impeller wheels, and a bearing system. Adjacent each of the radial-blade impeller wheels is an axial bearing with one respective rotor bearing half and one respective stator bearing half. The rotor bearing halves are each formed on the back face of the respective radial impeller wheel.

In practice, to contain the axial thrust of a rotor of a turbomachine using a magnetic bearing system, axial bearing surfaces are customarily used that are either formed directly on the shaft, or fixed by an additional axial bearing washer to the shaft. Correspondingly, turbomachines having an axial magnetically mounted rotor shaft are known in which the magnetic bearing halves for axial bearing are on an axial bearing washer, or on opposed shaft shoulders shrunk onto the rotor shaft.

EP 2 017 435 A2 describes a design having the features cited above for a turbomachine having as short a rotor as possible, and a rotor mass that is as small as possible. Because the rotor bearing halves are formed on the back faces of the radial impeller wheels, the space taken up by the axial bearing can be reduced significantly, the axial bearing halves being integrated into a housing wall and also integrated into the rear side of the radial impeller wheels, which must also be present independent of the bearing. The number of separate components is thereby reduced. The design known from EP 2 017 435 A2 is substantially symmetrical starting at an electric machine located centrally of the rotor between the two radial impeller wheels. Starting at the electric machine, sequentially in both directions, a radial magnetic bearing, a safety bearing, an opening through the assigned stator bearing half having an interior shaft gasket and finally at the end of the rotor shaft, the corresponding impeller wheel is mounted overhung. Starting at the electric machine, the diameter of the rotor shaft decreases in both directions successively, according to the cited components that are provided along the rotor shaft. During assembly, first the rotor shaft must be inserted through with the electric machine into the housing, the further components and finally the two impeller wheels are then installed on the two shaft ends. To make subsequent maintenance possible, the turbomachine must be accessible on both sides, and both axial impeller wheels must be made removable as well.

OBJECTS OF THE INVENTION

It is therefore an object of the present invention to provide an improved turbomachine.

Another object is the provision of such an improved turbomachine that overcomes the above-given disadvantages, in particular that is simple to assemble and disassemble as well as to maintain.

SUMMARY OF THE INVENTION

A turbomachine is made by first providing a stepped shaft having a large-diameter cylindrical portion, an intermediate-diameter cylindrical portion, and a small-diameter cylindrical portion all centered on a common axis. A separately manufactured a one-piece and annular first impeller wheel is then permanently mounted on the large-diameter portion with a back face of the first wheel facing axially toward the intermediate-diameter portion and carrying a rotor bearing half of an axial magnetic bearing. A rotor ring of a radial bearing is then detachably mounted on the intermediate-diameter portion of the shaft, and finally a one-piece and annular second impeller wheel is detachably mounted on the small-diameter portion of the shaft with a back face of the second wheel facing axially toward the first wheel and carrying a rotor bearing half of another axial magnetic bearing. The first and second wheels and rotor ring together form a rotor assembly that is then mounted in a support carrying respective stator rotor halves of the axial magnetic bearings and an outer stator ring of the radial bearing with the stator rotor halves each juxtaposed axially with a respective one of the rotor halves and the stator ring juxtaposed radially outside the inner rotor ring.

According to the invention, an asymmetric design is provided, and the first impeller wheel is mounted fixedly and nonremovably on the rotor shaft. Thus according to the invention the first radial impeller wheel cannot be separated from the rotor shaft, or can be separated from the rotor shaft only upon the exertion of a very large force or by taking special steps. Thus, it is possible, for example, to shrink the first axial impeller wheel onto the rotor shaft, to weld it or to press it onto the rotor shaft. Then, during assembly, starting with the first radial impeller wheel that is connected nonremovably, the further components, i.e. at least the stator bearing halves and finally the second radial impeller wheel are installed sequentially. According to the invention the individual steps of the shaft outer surface have outer diameters adapted to the inner diameters of the respective components to be mounted thereon. The individual components can easily be pushed up to the section at which they are to be mounted. As a result of the removable design of the second radial impeller wheel—depending on the design—disassembly or at least maintenance of the described components is possible. In particular, the components of the axial bearings are accessible starting from the second radial impeller wheel.

Because the stator bearing halves are pushed onto the rotor shaft from one end during assembly, separation into two half shells or segments is not required, as a result of which stability and impermeability are improved and production expense is also reduced.

To form an axial bearing, in particular an actively controllable axial bearing, magnetic windings of one of the halves of each bearing generate a magnetic field affecting the other bearing half, preferably controllable as needed. For practical reasons it is advantageous when the magnetic windings are in the fixed stator bearing halves.

To form a magnetic axial bearing, the rotor bearing halves must consist of a suitable material that magnetically interacts with the coils, or be covered with permanent magnets. Often, the material used for impeller wheels is not suited for forming rotor bearing halves of a magnetic bearing. In such a case, at least one of the radial impeller wheels can be formed by an impeller wheel body that includes a blade system and a disk consisting of a different material, e.g. an aluminum alloy, fastened at the rear side of the impeller wheel body, the disk forming the rotor bearing half of the corresponding axial bearing. Such a disk or such a ring with a central opening for the rotor shaft can, for example, be welded onto the impeller wheel body. To make precise welding possible, in particular, a connection by friction welding can be provided. Alternatively, it is also possible to provide a suitable material, for example, permanent magnets or a magnetizable material in the form of segments on the rear side of the radial impeller wheels, in particular to insert them into corresponding recesses.

The assembly and the optionally provided disassembly from one end permits, within the scope of the invention, that the first radial impeller wheel with further machine components is also mounted fixedly in a main housing. Advantageously, it is then provided that the rotor shaft extends out of the main housing, as a result of which the second radial impeller wheel is correspondingly located outside the main housing.

The turbomachine having at least two radial impeller wheels whose back faces confront each other (back-to-back arrangement), can serve as a compressor, expander or compander. While with a compressor having two compressor impeller wheels a drive, in particular by an electric machine, is to be provided, in the case of an expander having two impeller wheels, the energy that is being released can be recovered and used by an electric machine in the form of a generator. In the case of a compander having a compressor impeller wheel and an expander impeller wheel, an electric machine is only optionally provided, and it can be operated as a generator or as a motor depending on application.

According to a preferred design of the invention, the two radial impeller wheels are mounted overhung at respective ends of the rotor shaft. But in principle, it is also conceivable that on at least one of the two radial impeller wheels, the rotor shaft extends beyond this radial impeller wheel, and still at least one further device can be mounted on the rotor shaft, for example, a further radial impeller wheel.

The instant invention allows very large turbomachines to be made by assembling the pieces, as opposed to the prior-art system where, for instance, the shaft is cast unitarily with one of the impeller wheels. It is possible to build up systems with a throughput of 5000 m$^3$/h, a pressure differential of at least 10 bar, a shaft 50 cm or 1 m long, and an electrical capacity of 2-10 kw. Producing such a large turbomachine by casting the shaft and at least one of the impeller wheels together would be difficult, and assembling such a high-speed machine from parts joined diametrally at the rotation axis would be an invitation to catastrophic failure.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
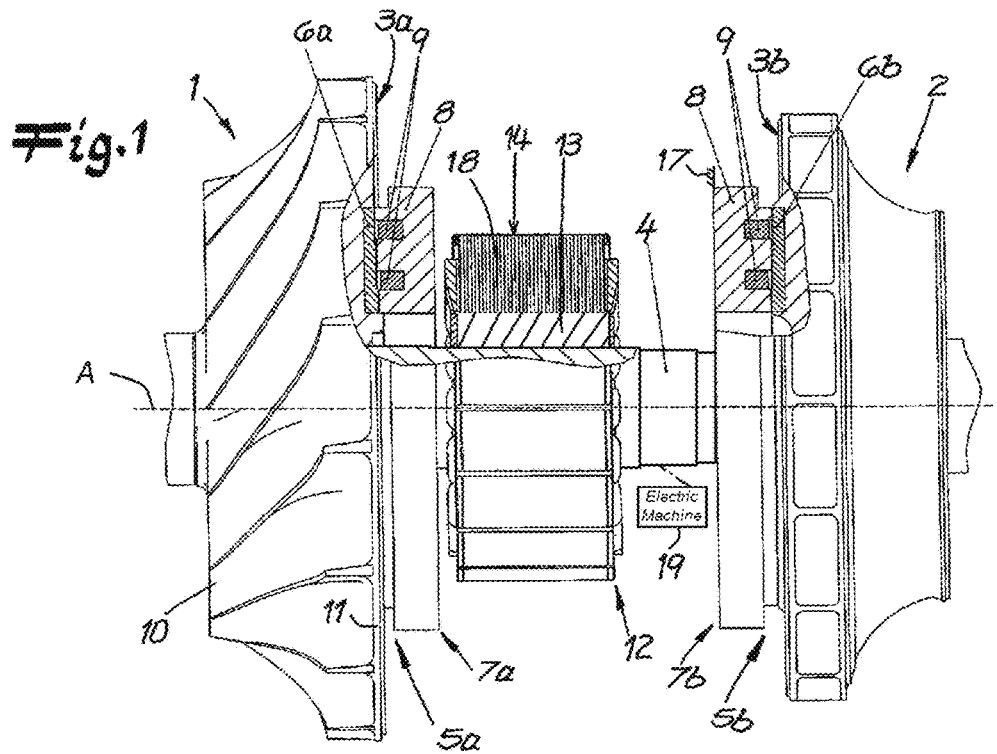
FIG. 1 shows components of a turbomachine according to the invention.

As seen in FIG. 1 a turbomachine according to the invention has a first impeller wheel 1 and a second impeller wheel 2 with respective back faces 3a and 3b turned axially relative to an axis A toward each other in a so-called back-to-back arrangement. The two wheels 1 and 2 are carried by and rotationally fixed to a common axially centered rotor shaft 4 mounted on a bearing system that in turn is carried on a fixed support indicated schematically at 17 and constituted by a machine housing.

The bearing system includes respective axial bearings 5a and 5b each having a rotor bearing half 6a or 6b and a stator bearing half 7a or 7b. The rotor bearing halves 6a and 6b are formed on the back faces 3a and 3b of the respective radial impeller wheels 1 and 2. The stator halves 7a and 7b are carried on the fixed support 17.

According to the invention, the first radial impeller wheel 1 is permanently mounted on the rotor shaft 4, for example by shrinking on, while the second radial impeller wheel 2 can be mounted so that it can be detached from the shaft 4. Thus, during assembly, the two stator bearing halves 7a and 7b and then the second radial impeller wheel 2 can be pushed in sequence onto the rotor shaft 4 to which the wheel 1 has already been fixed. To make this possible, the rotor shaft 4 decreases in cross-sectional size or diameter from the first radial impeller wheel 1 toward the second impeller wheel 2. Disassembly of the rotor system is also possible in reverse order.

FIG. 1 further shows that the stator bearing halves 7a and 7b each have a respective one-piece support ring 8 having an axially centered and throughgoing hole for the rotor shaft 4 and an electromagnetic winding 9 set in a groove formed in the respective support ring 8. In contrast, the rotor halves 6a and 6b on the back faces 3a and 3b of the radial impeller wheels 1 and 2 consist of a material that interacts magnetically with the magnetic windings 9. Thus the rotor bearing halves 6a and 6b are for example fitted with permanent magnets, magnetizable material or a material in which an opposing field is induced.

The specific embodiment according to FIG. 1 shows by way of example a design in which the first radial impeller wheel 1 is comprised of a body 10 formed with axially and radially extending blades and a flat disk 11 of a different material integrally fixed to the rear side of the body 10. The disk 11 forms the rotor bearing half 6a of the corresponding axial bearing 5a and is of a material selected for its magnetic properties. The rotor half 6a of the annular disk 11 with an axially centered and throughgoing through hole can, for example, be permanently connected to the blade body 10 by friction welding.

FIG. 1 further shows that the axially oppositely effective bearings 5a and 5b flank a radial bearing 12 mounted on the rotor shaft 4 and formed as a magnetic bearing with an inner rotor ring 13 carried on the shaft 4 and an outer stator ring 14 carried on the fixed support 17. While the stator ring 14 has magnetic windings 18, the rotor ring 13 consists of a material with suitable magnetic properties to form a radial magnetic bearing together with the magnetic windings 18 of the stator ring 14.

It can be seen that during assembly, first one stator bearing half 7a, then the radial bearing 12, then the other stator bearing half 7b, and finally the second radial impeller wheel 2 with the corresponding rotor bearing half 6b mounted on its back face 3b, are installed, one after the other. To facilitate assembly, the diameter of the rotor shaft 4 decreases in steps each intended to carry a respective one of the described components.

Within the scope of the design according to the invention, the described configuration is not only to be assembled successively, but can also in reverse sequence be at least partially disassembled, so that subsequent maintenance or the exchange of individual components is still possible.

Figure 2:
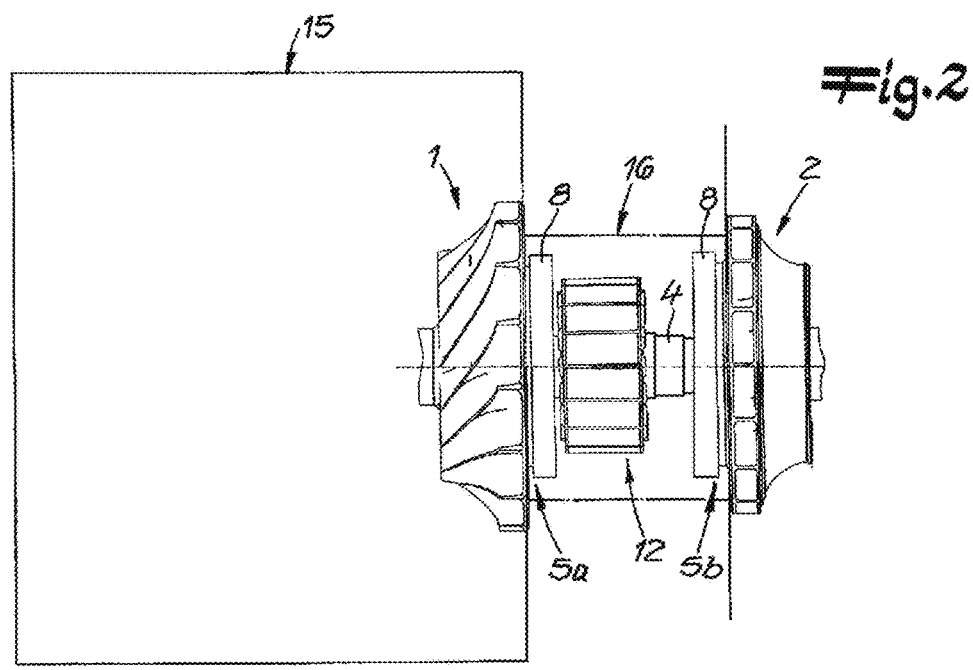
FIG. 2 shows the system according to FIG. 1 attached to a main housing.

For example, the first impeller wheel 1 can be fixed with other machine components in a main housing 15, with the rotor shaft 4 extending out of the main housing 15 and the second radial impeller wheel 2 mounted outside the main housing 15. A corresponding design is shown in FIG. 2. The advantage results that during assembly, maintenance, and disassembly of the bearing system, the main housing 15 can remain closed, while only an additional housing 16 that covers the bearing system must be removed.

In principle, the turbomachine can also have an electric machine 19 that is provided together with the radial bearing 12 between the radial impeller wheels 1 and 2. This machine 19 can be a motor, a generator, or a motor/generator.

Furthermore, the radial impeller wheels 1 and 2 can also be mounted overhung, that is each at a respective end of the rotor shaft 4. But the invention is not limited to this type of design. In principle, it is also possible that the rotor shaft 4 extends beyond at least one of the two radial impeller wheels 1 and 2, for instance into the housing 15.

I claim:

1. A method of making turbomachine comprising the steps of:
    providing a stepped shaft having a large-diameter cylindrical portion, an intermediate-diameter cylindrical portion, and a small-diameter cylindrical portion all centered on a common axis;
    separately manufacturing and then permanently mounting a one-piece and annular first impeller wheel on the large-diameter portion with a back face of the first impeller wheel facing axially toward the intermediate-diameter portion and carrying a rotor bearing half of an axial magnetic bearing;
    detachably mounting a rotor ring of a radial bearing on the intermediate-diameter portion of the shaft;
    detachably mounting a one-piece and annular second impeller wheel on the small-diameter portion of the shaft with a back face of the second impeller wheel facing axially toward the first impeller wheel and carrying another rotor bearing half of another axial magnetic bearing, whereby the shaft, the first and second impeller wheels, and the rotor ring together form a rotor assembly; and
    mounting the rotor assembly in a support carrying respective stator bearing halves of the axial magnetic bearings and an outer stator ring of the radial bearing with the stator bearing halves each juxtaposed axially with a respective one of the rotor halves and the outer stator ring juxtaposed radially outside the inner rotor ring.

2. The method defined in claim 1, wherein the first impeller wheel is shrunk onto the rotor shaft.

3. The method defined in claim 1, wherein the stator bearing halves each have a one-piece support ring having an axially throughgoing hole through which the shaft passes.

4. The method defined in claim 1, wherein at least one of the impeller wheels is formed by an impeller wheel body including a blade system and a disk of a different material mounted on a back side of the impeller wheel body, the disk forming the rotor bearing half of the respective axial bearing.

5. The method defined in claim 1, wherein the first impeller wheel is fixedly mounted together with further machine components in a main housing, the rotor shaft extending out of the main housing, the second impeller wheel being mounted outside the main housing.

6. The method defined in claim 1, further comprising the step of:
    mounting an electric machine is provided between the impeller wheels.

7. The method defined in claim 1, wherein both impeller wheels are mounted overhung at respective ends of the rotor shaft.

8. The method defined in claim 1, wherein the rotor ring is one piece.

9. The method defined in claim 1, wherein the rotor ring is mounted on the shaft before the second impeller wheel is mounted on the shaft.

\* \* \* \* \*